(12) United States Patent
Nakamura et al.

(10) Patent No.: US 6,415,093 B1
(45) Date of Patent: Jul. 2, 2002

(54) OPTICAL DEVICE AND ADHESIVE COMPOSITION USED THEREFOR

(75) Inventors: Koichiro Nakamura; Masahiro Hori; Hiroaki Yamamoto, all of Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/670,693

(22) Filed: Sep. 28, 2000

(30) Foreign Application Priority Data

Aug. 17, 2000 (JP) ........................................ 2000-247201

(51) Int. Cl.⁷ ................................................. G02B 6/00
(52) U.S. Cl. ........................ 385/141; 385/51; 385/142; 385/143; 385/144; 385/145; 430/321; 156/99; 156/307.3; 156/326; 156/329; 65/43; 65/17.1; 65/42; 65/60.52; 65/60.8
(58) Field of Search ........................... 430/321; 385/51, 385/141, 142, 143, 144, 145; 156/99, 307.3, 326, 329; 65/17.1, 42, 43, 60.52, 60.8

(56) References Cited

U.S. PATENT DOCUMENTS

| | | | | |
|---|---|---|---|---|
| 5,149,181 A | * | 9/1992 | Bedford | 351/166 |
| 5,422,756 A | * | 6/1995 | Weber | 359/487 |
| 5,581,646 A | * | 12/1996 | Tsukamoto et al. | 385/96 |
| 5,658,966 A | * | 8/1997 | Tsukamoto et al. | 522/99 |
| 5,783,115 A | * | 7/1998 | Bilkadi et al. | 252/582 |
| 5,955,542 A | * | 9/1999 | Davis et al. | 525/101 |
| 5,991,493 A | | 11/1999 | Dawes et al. | |

FOREIGN PATENT DOCUMENTS

| | | |
|---|---|---|
| JP | 5-40798 | 6/1993 |
| JP | 2786996 | 5/1998 |

OTHER PUBLICATIONS

Murata, "Adhesives for Optical Devices", Proceedings of the 48th ECTC, pp. 1178–1185, 1998.

Schmidt et al., "Hot Melt Adhesives for Glass Containers by the Sol–Gel Process", Journal of Non–Crystalline Solids 80 (1986) pp. 557–563.

Schmidt et al., "Glass Sealings by Sol–Gel Derived Organically Modified Silicates" Intl. Congr. On Glass•S, pp. 429–436, 1986.

\* cited by examiner

*Primary Examiner*—Robert Dawson
*Assistant Examiner*—Jeffrey B. Robertson
(74) *Attorney, Agent, or Firm*—Wenderoth, Lind & Ponack, L.L.P.

(57) ABSTRACT

An optical device having at least two optically transparent optical parts which are bonded together with an optically transparent adhesive layer. The adhesive layer is formed from a matrix containing silicon, titanium, zirconium, aluminum or germianium, and oxygen atoms. At least part of the atoms is bonded to other atom(s) through a polyvalent hydrocarbon group and directly bonded a monovalent hydrocarbon group. The refractive index value of the adhesive layer approximates to the refractive index values of the at least two optically transparent optical parts. An adhesive composition for bonding optical parts and a method of bonding optical parts are also proposed.

7 Claims, 6 Drawing Sheets

OPTICAL DEVICE AND ADHESIVE COMPOSITION USED THEREFOR

DETAILED DESCRIPTION OF THE INVENTION

The present invention relates to an optical device comprising optical parts bonded together with an optically transparent adhesive material, an adhesive composition for forming the same and a bonding method.

Technologies for increasing communication capacity have been acquiring greater importance due to the spread of the Internet. Bonding technologies used for the assembly of optical parts and optical elements used in optical fiber communication systems require high reliability, accurate adjustment of refractive index (for connecting optical paths), precise position accuracy (for connecting lenses) and high heat resistance (solder heat resistance). For the assembly of optical parts, soldering, laser welding and an organic adhesive such as an acrylic resin or epoxy resin have been used, or adhesives composed of organic-inorganic composite materials prepared by a sol-gel method have been proposed. (i) Proceedings of the 48th ECTC, pp. 1178–1185, 1998 proposes a fluorinated or sulfur-containing epoxy adhesive and epoxy-acrylic adhesive and (ii) Journal of Non-crystalline Solids, vol. 80, pp. 557–563, 1986 or (iii) Intl. Congr, On Glass.S, pp. 429–436, 1986 discloses organic and inorganic adhesives prepared by a sol-gel method. (iv) Japanese Patent No. 1829914 discloses an optical element which is produced using a sol-gel adhesive composed of an alkoxide and a metal salt and (v) Japanese Patent No. 2786996 discloses a prism which is constructed using an adhesive composed of a sllicate and alkoxide. Further, (vi) U.S. Pat. No. 5,991,493 discloses an optical element which is fabricated using an organic-inorganic composite adhesive, for example, an adhesive obtained by hydrolyzing a sol consisting of polydimethylsiloxane, methyltriethoxysilane and phenyltrifluorosilane.

However, technologies and adhesives for bonding these optical parts involve the following problems.

As for soldering and laser welding methods, fixed position accuracy is unsatisfactory, or a laser light source or advanced technology is required. Epoxy adhesives and acrylic adhesives (i) are inferior in heat resistance of 250° C. or more (solder heat resistance). Adhesives comprising an alkoxide and a metal salt (ii to vi) have such problems that the bonding strength of an adhesive layer is insufficient because a cohesive failure readily occurs in the adhesive layer and that bubbles remain by bonding together optical parts such as lenses, the adhesive layer becomes cloudy, or sufficient adhesion cannot be obtained because an alcohol formed by a hydrolytic reaction or water formed by a dehydration reaction is evaporated during thermal curing.

It is an object of the present invention to provide an adhesive composition which improves the above problems, has high adhesion strength and excellent heat resistance, and can be used to bond optical parts together without producing such a defect as cloudiness caused by bubbles by reducing the generation of bubbles at the time of curing.

It is another object of the present invention to provide a method of bonding optical parts using the adhesive composition of the present invention.

It is still another object of the present invention to provide an optical device comprising optical parts bonded together with the adhesive composition of the present invention.

Other objects and advantages of the present invention will become apparent from the following description.

According to the present invention, firstly, the above objects and advantages of the present invention are attained by an optical device comprising at least two optically transparent optical parts which are bonded together with an optically transparent adhesive layer, wherein the adhesive layer is formed from a matrix containing at least one type of specific atoms selected from the group consisting of silicon, titanium, zirconium, aluminum and germanium, and oxygen atoms, at least part of the specific atoms is bonded to other specific atom(s) through a polyvalent hydrocarbon group having 2 to 8 carbon atoms and directly bonded to at least one monovalent hydrocarbon group selected from the group consisting of an alkyl group, phenyl group, monovalent fluorine-containing hydrocarbon group and monovalent sulfur-containing hydrocarbon group, and the contents of the above specific atom, the polyvalent hydrocarbon group and the monovalent hydrocarbon group are adjusted such that the refractive index value of the adhesive layer approximates to the refractive index values of the at least two optically transparent optical parts.

According to the present invention, secondly, the above objects and advantages of the present invention are attained by an adhesive composition for bonding optical parts together, which comprises the following components (A), (B) and (C):
(A) organopolysiloxane having at least two alkenyl groups having 4 or less carbon atoms bonded to silicon atoms in the molecule;
(B) organohydrogenpolysiloxane having at least two hydrogen atoms bonded to silicone atoms in the molecule; and
(C) a platinum-based catalyst.

According to the present invention, thirdly, the above objects and advantages of the present invention are attained by a method of bonding optical parts together, which comprises placing an adhesive composition containing the above components (A), (B) and (C) between at least two optical parts to be bonded together and curing the adhesive composition.

The present invention will be described in detail hereinafter. A description is first given of the optical device.

A polyvalent hydrocarbon group having 2 to 8 carbon atoms is contained in the adhesive layer of the optical device of the present invention. When the number of carbon atoms of the polyvalent hydrocarbon group is too large, the heat resistance of the adhesive layer lowers and the hydrophobic nature of the adhesive layer increases, thereby deteriorating the adhesion of the adhesive layer to the surface of glass or other optical part. Therefore, the number of carbon atoms of the polyvalent hydrocarbon group must be 8 or less, preferably 4 or less. The polyvalent hydrocarbon group is selected from divalent to pentavalent hydrocarbon groups.

Examples of the divalent hydrocarbon group having 4 or less carbon atoms include ethylene, trimethylene, tetramethylene, methylethylene, ethylethylene, dimethylethylene, vinylene, propenylene, butenylene, methylvinylene, ethylvinylene, dimethylvinylene and methylpropenylene. Examples of the tervalent hydrocarbon group having 4 or less carbon atoms include 1,2,3-propanetoluyl group and 1,2,4-butanetoluyl group. Examples of the tetravalent hydrocarbon group having 4 or less carbon atoms include 1,3-propanediyl-2-ylidene group, 1,3-butanediyl-2-ylidene group and 1,4-butanediyl-2-ylidene group. Examples of the pentavalent hydrocarbon group having 4 or less carbon atoms include 1,3-butanediyl-2,4-ylidene group and 1,4-butanediyl-2,3-ylidene group. The hydrogen atoms of the polyvalent hydrocarbon group having 4 or less carbon atoms may be substituted with heavy hydrogen or elemental halogen such as fluorine, chlorine or bromine. An adhesive layer having high transmission of light having a communication wavelength of 1.55 μm or 1.3 μm can be provided by substituting with heavy hydrogen or halogen. Out of these, ethylene, trimethylene and tetramethylene are preferred and ethylene is the most preferred from the viewpoints of synthesis ease and heat resistance.

The monovalent hydrocarbon group contained in the adhesive layer of the optical device of the present invention is selected from an alkyl group, aryl group, monovalent fluorine-containing hydrocarbon group and monovalent sulfur-containing hydrocarbon group. Examples of the alkyl group include methyl, ethyl, propyl, butyl, pentyl, hexyl, heptyl, octadecyl and the like. Examples of the aryl group include phenyl, methylphenyl, ethylphenyl, dimethylphenyl, trimethylphenyl, biphenyl, naphthyl and the like. Examples of the monovalent fluorine-containing hydrocarbon group include trifluoromethyl, pentafluoroethyl. heptafluoropropyl, trifluoropropyl and the like. Examples of the monovalent sulfur-containing hydrocarbon group include hydrocarbon groups having a thiol group, sulfide group, disulfide group, polysulfide group or sulfone group.

The hydrogen atom of these monovalent hydrocarbon groups may be substituted with heavy hydrogen or elemental halogen such as fluorine, chlorine or bromine. An adhesive layer having high transmission of light having a communication wavelength of 1.55 μm or 1.3 μm can be provided by substituting with heavy hydrogen or halogen. Out of these, methyl, phenyl and trifluoromethyl are preferred from the viewpoints of synthesis ease, heat resistance and the control of refractive index.

The adhesive layer of the optical device of the present invention is formed from a matrix containing at least one type of specific atoms selected form the group consisting of silicon, titanium, zirconium, aluminum and germanium, and oxygen atoms. At least one of the specific atoms is bonded to other specific atom(s) through a polyvalent hydrocarbon group having at least 2 carbon atoms. At least one of the specific atoms is directly bonded to at least one monovalent hydrocarbon group selected from the group consisting of an alkyl group, phenyl group, monovalent fluorine-containing hydrocarbon group and monovalent sulfur-containing hydrocarbon group. The contents of each of the specific atoms, the polyvalent hydrocarbon group and the monovalent hydrocarbon group are adjusted such that the refractive index value of the adhesive layer should approximate to the refractive index values of the at least two optically transparent optical parts.

The adhesion strength of the adhesive layer can be increased and the refractive index thereof can be adjusted by using at least one type of specific atoms (may be referred to as "network forming atoms" hereinafter) selected from the group consisting of silicon, titanium, zirconium, aluminum and germanium as the atoms forming the basic skeleton of a compound forming the adhesive layer of the optical device of the present invention. For example, silicon atoms are used to provide an adhesive layer having excellent heat resistance, weatherability, humidity resistance and chemical resistance. A matrix is formed by using titanium, zirconium, aluminum or germanium alone or mixing with other element such as silicon to provide an adhesive layer having excellent heat resistance, weatherability, humidity resistance and chemical resistance and a large refractive index. At least one of the network forming atoms of the present invention is bonded to other network forming atom(s) through a polyvalent hydrocarbon group having at least two carbon atoms.

When the above network forming atom is a silicon atom and the polyvalent hydrocarbon group is a divalent hydrocarbon group such as an ethylene group ($-CH_2CH_2-$), at least part of silicon atoms is bonded to other silicon atom through the ethylene group as shown in the following formula (3).

(3)

When the network forming atom is a silicon atom and the polyvalent hydrocarbon group is a tervalent hydrocarbon group such as a 1,2,3-propanetoluyl group, the silicon atom is bonded to other silicon atoms through the 1,2,3-propanetoluyl group as shown in the following formula (4).

(4)

Thus, the elasticity of the adhesive layer is increased and the fragility of the adhesive layer is reduced by the above structure that the network forming atom of the present invention is bonded to other network forming atom(s) through a polyvalent hydrocarbon group compared with a conventional structure that a network forming atom is bonded to other network forming atom through an oxygen atom, whereby a cohesive failure hardly occurs and adhesion strength increases.

In the adhesive layer of the present invention, at least part of the network forming atoms is directly bonded to at least one monovalent hydrocarbon group selected from the group consisting of an alkyl group, phenyl group, monovalent fluorine-containing hydrocarbon group and monovalent sulfur-containing hydrocarbon group. When the monovalent hydrocarbon group is existent in the matrix comprising the network forming atoms and oxygen atoms, it provides oxidation resistance, heat resistance and solvent resistance to the matrix. Since the network forming atom in the present invention has such a structure that it is bonded to other network forming atom through the monovalent hydrocarbon group, an adhesive material having excellent adhesion strength and environmental resistance (heat resistance, weatherability, humidity resistance and chemical resistance) can be provided.

When the amount of the polyvalent hydrocarbon group contained in the adhesive layer is too large, the molecular weight of a sIloxane is reduced relatively and the viscosity of a liquid composition lowers, thereby deteriorating coating work efficiency and when the amount is too small, the effect of increasing the adhesion strength of the adhesive layer is reduced, the molecular weight of a siloxane increases relatively, and the viscosity of a liquid composition becomes too high, thereby deteriorating coating work efficiency. When the amount of the monovalent hydrocarbon group contained in the adhesive layer is too large, adhesion to glass lowers and when the amount is too small, the oxidation resistance of the adhesive layer lowers. Therefore, the adhesive layer contains the polyvalent hydrocarbon group and the monovalent hydrocarbon group in amounts of preferably 0.01 to 30 wt % and 30 to 80 wt %, more preferably 0.02 to 20 wt % and 40 to 70 wt %, respectively.

In the present invention, the contents of each of the network forming atoms, the polyvalent hydrocarbon group and the monovalent hydrocarbon group are adjusted such that the refractive index value of the adhesive layer should approximate to the refractive index values of the at least two optically transparent optical parts. In concrete terms, when the refractive indices of two adjacent optical parts are represented by $n_1$ and $n_2$ (with the proviso that $n_1 \geq n_2$), the adhesive layer between the adjacent optical parts preferably has a refractive index $n_3$ represented by the following expression (1). The adhesive layer more preferably has a refractive index $n_3$ represented by the following expression (2).

$$\sqrt{(n_1 \cdot n_2)} - ((\sqrt{(n_1 \cdot n_2)} - n_2)/3) - 0.05 \leq n_3 \leq \sqrt{(n_1 \cdot n_2)} + ((n_1 - \sqrt{(n_1 \cdot n_2)})/3) + 0.05 \quad (1)$$

$$\sqrt{(n_1 \cdot n_2)} - ((\sqrt{(n_1 \cdot n_2)} - n_2)/4) - 0.03 \leq n_3 \leq \sqrt{(n_1 \cdot n_2)} + ((n_1 - \sqrt{(n_1 \cdot n_2)})/4) + 0.03 \quad (2)$$

For example, when optical fibers are bonded to each other and have a refractive index of 1.45, $1.40 \leq n_3 \leq 1.50$ according to the above expression (1) and $1.42 \leq n_3 \leq 1.48$ according to the above expression (2). An optical device having a small optical propagation loss can be obtained by adjusting the refractive index of the adhesive layer. As for optical parts other than optical fibers, such as lenses, filters, optical waveguides, diffraction gratings and optically active elements, an optical device having a small optical propagation loss can be provided by adjusting the refractive index.

The method of forming the adhesive layer of the present invention will be described hereinafter.

Methods of forming a bond between the polyvalent hydrocarbon group and two or more network forming atoms include one in which a raw material compound having a polyvalent hydrocarbon group bonded to two or more network forming atoms is used, one in which a metal compound having a polymerizable reactive group directly bonded to a metal compound is formed by thermal and/or optical polymerization, and one in which the bond is formed by a hydrosililation reaction between an alkenyl compound and a hydrogenated silicon compound. The method in which a raw material compound having a polyvalent hydrocarbon group bonded to two or more network forming atoms is used is exemplified by one in which the raw material compound is formed by hydrolysis and a dehydration condensation reaction among bis(trialkoxysilyl)ethane, bis(trialkoxysilyl) propane and bis(trialkoxysilyl)butane as raw materials. The method of forming the metal compound by thermal and/or optical polymerization is exemplified by one in which the metal compound is formed by mixing an optically radical generating agent with vinyltrialkoxysilane or vinyl both-terminated polydimethylsiloxane and polymerizing these through optical exposure. The method of forming the bond by a hydrosililation reaction between an alkenyl compound and a hydrogenated silicon compound is exemplified by one in which the bond is formed by a hydrosililation reaction between vinyl both-terminated dimethylsiloxane and hydrogenated dimethylsiloxane in the presence of a platinum catalyst. Out of these forming methods, the method of forming the bond through a hydrosililation reaction between an alkenyl compound and a hydrogenated silicon compound is preferred because the heat resistance of the formed adhesive layer is particularly excellent the formation of bubbles caused by a reaction by-product can be prevented and shrinkage in the curing step is small.

Preferably, the adhesive composition for bonding optical parts together comprises the following components (A) to (C):

(A) organopolysiloxane having at least two alkenyl groups having 4 or less carbon atoms bonded to silicon atoms in the molecule;

(B) organohydrogenpolysiloxane having at least two hydrogen atoms bonded to silicon atoms in the molecule; and (C) a platinum-based catalyst.

Examples of the organopolysiloxane compound having at least two alkenyl groups having 4 or less carbon atoms bonded to silicon atoms in the molecule (component (A)) include hydrogen terminated polydimethyluiloxane compounds, methylhydrogensiloxane-dimethylsiloxane copolymer compounds, polymethylhydrogensiloxane compounds, polyethylhydrogensiloxane compounds, polyphenyl(dimethylhydrogensiloxy)siloxane hydrogen terminated compounds, methylhydrogensiloxane-phenylmethylsiloxane copolymer compounds and methylhydrogensiloxane-octylmethylsiloxane copolymer compounds having a vinyl group, vinyloxy group (2 carbon atoms), allyl group, allyloxy group (3 carbon atoms), acryl group, acryloxy group (2 carbon atoms), methacryl group or methacryloxy group (3 carbon atoms). Out of these, both terminal vinyl group dimethylsiloxane polymers represented by the following formula (5), vinylmethylsiloxane-dimethylsiloxane copolymers represented by the following formula (6), both terminal vinyl group diphenylsiloxane-dimethylsiloxane copolymers represented by the following formula (7) and both terminal vinyl group methyltrimethylpropylsiloxanedimethylsiloxanes represented by the following formula (8) are preferred. The component (A) preferably has a viscosity of 100 to 250,000 cS at 25° C. from the viewpoint of coating work efficiency.

(n = 3 to 1,500)

(m = 1 to 150, n = 2 to 150)

-continued (7)

(m = 2 to 150, n = 2 to 300)

(8)

(m = 2 to 300, n = 2 to 150)

Examples of the organohydrogenpolysiloxane compound having at least two hydrogen atoms bonded to silicon atoms in the molecule (component (B)) include hydrogen terminated polydimethylsiloxane compounds represented by the following formula (9), methylhydrogensiloxane-dimethylsiloxane copolymer compounds represented by the following formula (10), polyphenyl(dimethylhydrogensiloxane)siloxane hydrogen terminated compounds represented by the following formula (11), methyltrifluoropropylsiloxane(dimethylsiloxane)copolymer represented by the following formula (12), polymethylhydrogensiloxane compounds, polyethylhydrogensiloxane compounds and methylhydrogensiloxane-phenylmethylsiloxane copolymer compounds.

(9)

(n = 3 to 150)

(10)

(m = 2 to 200, n = 2 to 200)

(11)

(m = 2 to 100, n = 2 to 50)

(12)

(m = 2 to 100, n = 2 to 50)

Examples of the platinum-based catalyst (component (C)) used in the adhesive composition of the present invention include a platinum-slloxane complex, platinum-olefin complex, platinum-($\beta$-diketone)complex, platinum-azo complex or the like. Preferred examples of the catalyst include platinum-carbonylvinylmethyl complex, platinum-divinyltetramethyldisiloxane complex, platinum-cyclovinylmethylsiloxane complex, platinum-octylaldehyde/octanol complex and the like.

The contents of the component (A) and the component (B) in the adhesive composition are desirably such that the number of the hydrogen atoms contained in the component (B) is 0.4 to 6.0 times, more preferably 0.6 to 4.0 times the total number of alkenyl groups contained in the component (A). The above platinum-based catalyst (component (C)) is preferably contained in an amount of 10 to 1,000 ppm based on the total weight of the component (A) and the component (B) because appropriate curing speed is maintained and appropriate pot life is achieved.

The adhesive composition of the present invention may contain a tetraalkoxide (trialkoxide in the case of aluminum) of at least one type of network forming atoms selected from the group consisting of silicon, titanium, zirconium, aluminum and germanium and a condensate of one or more of these metal alkoxides in small quantities in addition to the above components (A) to (C). These components cause the formation of bubbles and volume shrinkage through dehydration or dealcoholation during the curing reaction of the adhesive layer. The total content of these components may be 20 wt % or less based on the total weight of the adhesive composition.

A description is subsequently given of the optical parts of the present invention. Examples of the optical parts of the present invention include optical fibers, lenses, filters, optical waveguides, diffraction gratings and optical active elements. The optical fibers include single-mode optical fibers and multi-mode optical fibers. The lenses include refractive index distribution lenses, spherical lenses, aspherical lenses and plano-convex lenses. The optical filters include narrow-band filters composed of a dielectric multi-layer film, band-pass filters and polarization filters. The optical waveguides include single-mode optical waveguides and multi-mode optical waveguides. These optical waveguides may have a Bragg diffraction grating whose refractive index is modulated periodically. The materials forming these optical parts include glass materials, plastic materials and organic-inorganic composite materials.

The materials forming the above optical parts preferably have a linear expansion coefficient of $1.5 \times 10^{-5}/°$ C. or less. When the linear expansion coefficient of the base material is higher than $1.5 \times 10^{-5}/°$ C. like a plastic optical part made from polypropylene having a high thermal expansion coefficient (9 to $15 \times 10^{-5}/°$ C.), an optical part and an adhesive layer peel off at the interface or the adhesive layer cracks in the heating step after the application of the adhesive. General inorganic glass has a linear expansion coefficient of $1.5 \times 10^{-5}/°$ C. or less. At least the bonded surface of an optical part is preferably made from an oxide. When the bonded surface of an optical part is not made from an oxide, adhesion strength lowers in the step of forming the adhesive layer or the bonded surface and the adhesive layer peel off at the interface as the case may be. Preferred examples of the base material include oxide glasses such as silicate-based glass, boric acid-based glass and phosphoric acid-based glass, quartz, ceramics, epoxy resins, glass fiber reinforced polystyrene and the like. The adhesive layer of the present invention is hardly bonded to a metal as it is but when the surface of the metal is treated with an oxidizing agent, the metal can be used as a part to be bonded.

To assemble these optical parts, the optically transparent adhesive composition of the present invention is placed, filled or spread out between a first optical part and a second optical part and cured to form a bonded portion having predetermined strength. As for the curing of the adhesive, an adhesive composition which is cured in a few minutes can be obtained by increasing the amount of a curing catalyst and an adhesive composition having a pot life of a few hours can be obtained by reducing the amount of a curing catalyst. The curing time can be shortened by carrying out a heat treatment as required. A reaction retardant or curing accelerator may be added in an amount of 40 wt % or less, preferably 30 wt % or less as required. The curing time can be freely controlled by adding a reaction retardant and curing accelerator.

Examples are given below to further illustrate the present invention.

EXAMPLES

Preparation of First Raw Materials (Raw Materials A to I)

(Raw Material A)

0.039 mol (5 g) of dimethyldichlorosilane, 4 mols (72 g) of water and 1 mol (120.6 g) of dimethylvinylchlorosilane were mixed together and reacted with one another at 60° C. for 2 hours. Water and unreacted dimethylvinylchlorosilane were removed from the reaction mixture under reduced pressure and the reaction mixture was dehydrated to obtain terminal vinyl polydimethylsiloxane (viscosity: 1.000 cS, molecular weight: 28.000, content of vinyl group: 0.18 to 0.26 wt %) (raw material A).

(Raw Material B)

1 mol (253.13 g) of diphenyldichlorosilane, 1 mol (129.3 g) of dimethyldichlorosilane, 4 mols (72 g) of water and 1 mol (120.6 g) of dimethylvinylchlorosilane were mixed together and reacted with one another at 60° C. for 2 hours. Water and unreacted dimethylvinylchlorosilane were removed from the reaction mixture under reduced pressure and the reaction mixture was dehydrated to obtain a vinyl terminated diphenylsiloxane-dimethylsiloxane copolymer (viscosity: 500 cS, molecular weight: 9,500, content of phenyl group: 18 to 22 wt %, content of vinyl group: 0.37 to 0.42 wt %) (raw material B).

(Raw Material C)

1 mol of methyltrifluoropropyldichlorosilane, 1 mol of dimethyldichlorosilane, 4 mols of water and 1 mol of dimethylvinylchlorosilane were mixed together and reacted with one another at 60° C. for 2 hours. Water and unreacted dimethylvinylchlorosilane were removed from the reaction mixture under reduced pressure and the reaction mixture was dehydrated to obtain a vinyl terminated methyltrifluoropropylsiloxane-dimethylsiloxane copolymer (viscosity: 500 cS, molecular weight: 9,500) (raw material C).

(Raw Material D)

5 g (0.0676 mol) of ethanol and 0.01 mol of an aqueous solution of hydrochloric acid containing 10 mols of water were added to 5 g (0.0240 mol) of tetraethoxysilane and stirred at room temperature for 2 hours. 11.58 g (0.096 mol) of dimethylvinylchlorosilane which was 4 molar equivalents of tetraethoxysilane was added to the resulting solution to carry out a reaction at 60° C. for 2 hours. Ethanol, water and unreacted dimethylvinylchlorosilane were removed from the reaction mixture under reduced pressure and the reaction mixture was dehydrated to obtain an equivalent to the Vinyl Q Resin (of Guerest Co., Ltd., viscosity of 5,000 cS) (raw material D).

(Raw Material E)

1.89 g (0.0189 mol) of acetylacetone, 5 g of isopropanol and 0.01 mol of an aqueous solution of hydrochloric acid containing 4 mols of water were added to 5 g (0.0189 mol) of tetraisopropoxytitanium and stirred at room temperature for 2 hours. 9.12 g (0.0756 mol) of dimethylvinylchlorosilane which was 4 molar equivalents of tetraisopropoxytitanium was added to the resulting solution to carry out a reaction at 60° C. for 2 hours. Isopropanol, acetylacetone, water and unreacted dimethylvinylchlorosilane were removed from the reaction mixture under reduced pressure to obtain a vinyl terminated titanium oxide condensate (raw material E).

(Raw Material F)

2 molar equivalents of acetylacetone, 5 g of butanol and 0.01 mol of an aqueous solution of hydrochloric acid containing 4 molar equivalents of water were added to 5 g (0.0130 mol) of tetrabutoxyzirconium and stirred at room temperature for 2 hours. 6.27 g (0.052 mol) of dimethylvinylchlorosilane which was 4 molar equivalents of tetrabutoxyzirconium was added to the resulting solution to carry out a reaction at 60° C. for 2 hours. Isopropanol, acetylacetone, water and unreacted dimethylvinylchlorosilane were removed from the reaction mixture under reduced pressure to obtain a vinyl terminated zirconium oxide condensate (raw material F).

(Raw Material G)

1 molar equivalent of acetylacetone, 5 g of butanol and 0.01 mol of an aqueous solution of hydrochloric acid containing 4 molar equivalents of water were added to 5 g (0.0183 mol) of tri-sec-butoxyaluminum and stirred at room temperature for 2 hours. 8.83 g (0.0732 mol) of dimethylvinylchlorosilane which was 4 molar equivalents of tri-sec-butoxyaluminum was added to the resulting solution to carry out a reaction at 60° C. for 2 hours. Isopropanol, acetylacetone, water and unreacted dimethylvinylchlorosilane were removed from the reaction mixture under reduced pressure to obtain a vinyl terminated aluminum oxide condensate (raw material G).

(Raw Material H)

2 molar equivalents of water and 8.10 g (0.0672 mol) of dimethylvinylchlorosilane were added to 5 g (0.0168 mol) of diphenyldichlorogermanium to carry out a reaction at 60° C. for 2 hours. Water and unreacted dimethylvinylchlorosilane were removed from the reaction mixture under reduced pressure to obtain a vinyl terminated germanium oxide condensate (raw material H).

(Raw Material I)

Raw material I was prepared in the same manner as in the preparation of raw material A except that 1 mol of allyldimethylchlorosilane was used in place of 1 mol of dimethylvinylchlorosilane used for the preparation of raw material A.

Optical Part (Optical Fiber)

A glass single-mode optical fiber (clad diameter: 120 $\mu$m, core diameter: 10 $\mu$m, refractive index of core: 1.46, refractive index of clad: 1.44) was prepared.

(Lens)

A glass microlens (Selfoc Microlens SMC18, diameter: 1.8 mm, length: 4.43 mm (0.23 pitch, refractive index of center portion: 1.590, distribution coefficient g=0.326, 1 pitch (=2 $\pi$/g)=19.27 mm) was prepared.

(Filter)

A bandpass filter was prepared by laminating a silicon oxide layer (refractive index: 1.46) and a titanium oxide layer (refractive index: 2.1) on one side of a glass substrate (refractive index: 1.46) alternately.

(Optical Waveguide)

An optically radical forming agent was added in an amount of 3 wt % based on the total weight to a liquid composition obtained by mixing together a silica raw material solution obtained by hydrolyzing acryloxypropyltrimethoxysilane with 0.1N hydrochloric acid and a zirconia raw material obtained by treating zirconium tetrabutoxide with an equimolar amount of acrylic acid in a Si/Zr ratio of 1:1 to obtain a solution for forming an optical waveguide. This solution was applied to a silicon substrate having a 8 μm-thick silica film (V-shaped groove for fixing an optical fiber was formed in an end portion thereof) by spin coating and heated at 80° C. for 10 minutes and a waveguide portion was exposed to light by a high-pressure mercury lamp (at 10 mW for 15 seconds) through a photomask. Unexposed portions were dissolved in isopropanol and removed. A liquid composition whose Si/Zr ratio was adjusted to 1.2:1 was coated on the substrate and dried to obtain an embedded waveguide.

(Waveguide Type Diffraction Grating)

A Bragg grating was formed on the above optical waveguide by a double-beam interference exposure method to obtain a waveguide type diffraction grating.

The refractive index values at related sites of the above optical parts are shown in Table 1.

Table 1

| optical part | refractive index |
| --- | --- |
| optical fiber (core) | 1.45 |
| lens (center portion) | 1.590 |
| optical waveguide (core) | 1.52 |
| optical filter | 1.46 |

Preparation of Adhesive Compositions

As shown in Table 2, methylhydrogensiloxane-dimethylsiloxane copolymer J (viscosity: 25 to 35 cS, molecular weight: 2,000) or methylhydrogensiloxane-phenylmethylsiloxane copolymer K (viscosity: 100 cS) (copolymer J or K will be referred to as "second raw materials" hereinafter) was added to the first raw material to ensure that the number of hydrogen atoms contained in the second raw material should be 0.4 to 6.0 times the total number of alkenyl groups contained in the above first raw material and a platinum catalyst (platinum-divinyltetramethyldisiloxane complex) was mixed in an amount of 100 ppm based on the total to obtain adhesive compositions (1) to (17).

10 mg of each of the above adhesive compositions (1) to (17) was dropped onto a first slide glass (25 mm×50 mm×1.2 mm), a second slide glass was placed upon the first slide glass to spread the adhesive composition to a size of 25 mm×25 mm, and the adhesive composition was then heated on a hot plate at 200° C. for 15 minutes. The appearance of the adhesive layer between the first and second glasses was observed to check the formation of air bubbles and the cloudiness of the layer. 1 g of the adhesive composition was placed in a 3 ml glass sample bottle and heated at 200° C. for 30 minutes to measure the volume of the adhesive composition before and after the heat treatment to evaluate a volume shrinkage factor (%) represented by 100×(volume before heating−volume after heating)/(volume before heating). To evaluate the adhesion strength (cohesive failure rate) of the adhesive layer, the glass plates on both sides of the adhesive layer were pulled in opposite directions at a rate of 50 cm/min to measure adhesion (shear) strength (N/mm$^2$). The results are shown in Table 3. In Examples (adhesive compositions (1) to (17)), the formation of bubbles was not observed during the heat treatment, volume shrinkage was very small, and adhesion strength was sufficient. Rupture did not occur at the interface between the adhesive layer after an adhesion strength test and glass but was seen in the interior of the adhesive layer.

Comparative Example 1

1.33 ml of polydimethylsiloxane (PDMS), 35.6 ml of methyltriethoxysilane (MTES) and 2.67 ml of phenyltrifluorosilane (PTFS) were injected into a 100 ml sample tube (molar ratio of 8:83:9) and stirred at room temperature for 5 minutes by covering the tube. The mixture was heated at 70° C., and 5.4 g of water was added and strongly stirred for 30 minutes. The reaction mixture was separated into two layers at first but became uniform after that. By removing the cover, the reaction mixture was left in the atmosphere for 1 day and the solvent was naturally dried to obtain an adhesive composition (18). The formation of bubbles during the heat treatment, volume shrinkage and adhesion strength of this adhesive composition were measured in the same manner as the above adhesive compositions (1 to 17). The results are shown in Table 3. Bubbles were formed during the heat

TABLE 2

| adhesive composition No. | first raw material | | | | second raw material | | ratio of number of hydrogen atoms to total number of alkenyl groups |
| --- | --- | --- | --- | --- | --- | --- | --- |
| | type | quantity (g) | type | quantity (g) | type | quantity (g) | |
| 1 | A | 0.5 | — | — | J | 0.01 | 1.5 |
| 2 | B | 0.6 | — | — | J | 0.01 | 1.5 |
| 3 | C | 0.5 | — | — | J | 0.01 | 1.5 |
| 4 | D | 0.4 | — | — | J | 0.01 | 1.5 |
| 5 | E | 0.4 | — | — | J | 0.01 | 1.5 |
| 6 | F | 0.4 | — | — | J | 0.01 | 1.5 |
| 7 | G | 0.5 | — | — | J | 0.01 | 1.5 |
| 8 | H | 0.4 | — | — | J | 0.01 | 1.5 |
| 9 | A | 0.26 | B | 0.14 | J | 0.01 | 1.5 |
| 10 | A | 0.08 | B | 0.32 | K | 0.01 | 2.0 |
| 11 | B | 0.16 | C | 0.24 | J | 0.01 | 1.5 |
| 12 | B | 0.28 | D | 0.12 | J | 0.01 | 1.5 |
| 13 | A | 0.16 | E | 0.24 | J | 0.01 | 1.5 |
| 14 | A | 0.16 | F | 0.24 | J | 0.01 | 1.5 |
| 15 | A | 0.2 | G | 0.20 | J | 0.01 | 1.5 |
| 16 | A | 0.32 | H | 0.08 | J | 0.01 | 1.5 |
| 17 | I | 0.40 | — | — | J | 0.01 | 1.5 | treatment and air bubbles continuous from the center to the end portions of glass were formed in the adhesive composition (18) shown as Comparative Example. Along with the generation of gas, volume shrinkage was observed and adhesion strength was not sufficient. Rupture did not occur at the interface between the adhesive layer after the adhesion strength test and glass but the rupture of the interior of the adhesive layer and the rupture of the adhesive layer itself caused by the existence of bubbles in the adhesive layer were observed. The formation of bubbles made the adhesive layer cloudy, impaired the light transmission of the adhesive layer and increased the light transmission loss of the bonded optical part. The volume shrinkage of the adhesive layer changed the distance between optical parts to be bonded together (shift in focusing point when a lens and other optical part are bonded together), thereby causing a light transmission loss or internal distortion in the adhesive layer or cracking the adhesive layer. As a result, the optical properties of the optical parts are apt to deteriorate.

adhesive composition was coated and cured were measured and compared with each other (1 to 3 of Table 4).

Examples 4 to 6
(Bonding Lens to Lens)

Figure 2:
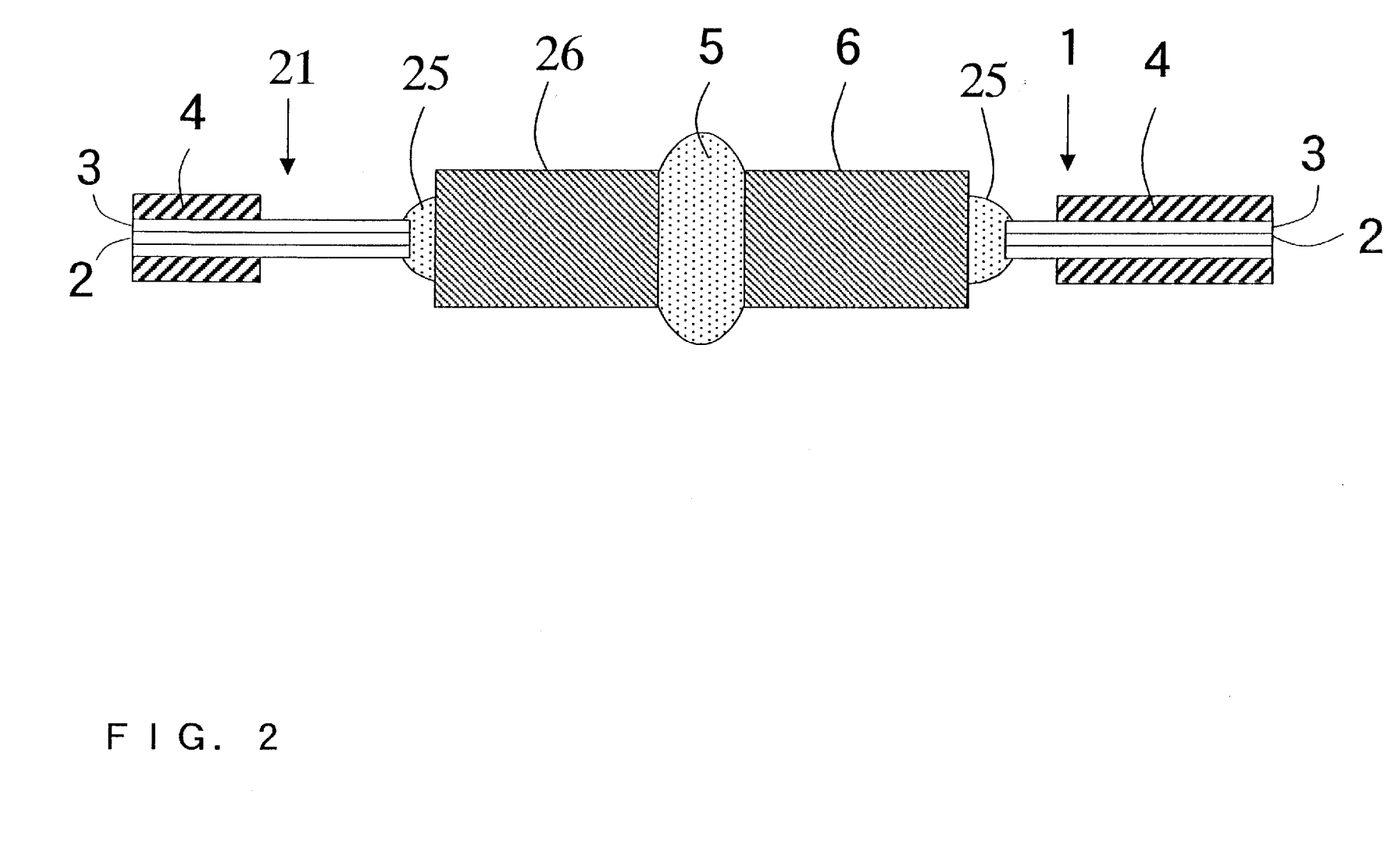
FIG. 2 is a sectional view of another embodiment of the present invention.

As shown in FIG. 2, one end portions of first and second single-mode glass optical fibers (length of about 1 mm, polymer coated layer 4 was removed from one ends thereof) 1 and 21, each having a polymer coated layer 4 core portion 2 and clad portion 3, were bonded to one end portions of the above two glass microlenses 6 and 26 (Selfoc Microlens SMC18) by an adhesive 25, respectively. The other end portions of the microlenses 6 and 26 were opposed to each other, the centers thereof were aligned with each other on an optical bench (not shown), and the locations of the lenses were adjusted such that the optical loss value when laser light having a wavelength of 1,550 nm was input from the other end of the optical fiber 1, transmitted through the first microlens 6 and the second microlens 26 through an about 250 μm air gap and output from the other end of the optical

TABLE 3

| adhesive composition No. | content of polyvalent hydrocarbon group (wt %) | content of monovalent hydrocarbon group (wt %) | refractive index | appearance of glass adhesive bubbles | appearance of glass adhesive cloudiness | shrinkage factor (%) | adhesion strength (N/mm$^2$) |
|---|---|---|---|---|---|---|---|
| 1  | 0.2 | 40 | 1.42 | none | none | less than 0.1 | 2.3 |
| 2  | 0.2 | 45 | 1.55 | none | none | less than 0.1 | 2.4 |
| 3  | 0.2 | 45 | 1.39 | none | none | less than 0.1 | 2.2 |
| 4  | 3.0 | 35 | 1.43 | none | none | less than 0.1 | 2.1 |
| 5  | 5.0 | 40 | 1.60 | none | none | less than 0.1 | 2.2 |
| 6  | 3.0 | 40 | 1.58 | none | none | less than 0.1 | 2.3 |
| 7  | 2.0 | 30 | 1.57 | none | none | less than 0.1 | 2.1 |
| 8  | 0.5 | 50 | 1.59 | none | none | less than 0.1 | 2.0 |
| 9  | 0.2 | 40 | 1.46 | none | none | less than 0.1 | 2.2 |
| 10 | 0.2 | 45 | 1.52 | none | none | less than 0.1 | 2.3 |
| 11 | 0.2 | 45 | 1.49 | none | none | less than 0.1 | 2.1 |
| 12 | 0.2 | 45 | 1.46 | none | none | less than 0.1 | 2.3 |
| 13 | 0.2 | 45 | 1.53 | none | none | less than 0.1 | 2.1 |
| 14 | 0.2 | 45 | 1.53 | none | none | less than 0.1 | 2.2 |
| 15 | 0.2 | 45 | 1.49 | none | none | less than 0.1 | 2.2 |
| 16 | 0.2 | 45 | 1.46 | none | none | less than 0.1 | 2.1 |
| 17 | 0.2 | 45 | 1.40 | none | none | less than 0.1 | 2.1 |
| 18 | — | — | 1.43 | yes | yes | 60 | 0.3 |

Examples 1 to 3
(Bonding Optical Fiber to Optical Fiber)

Figure 1:
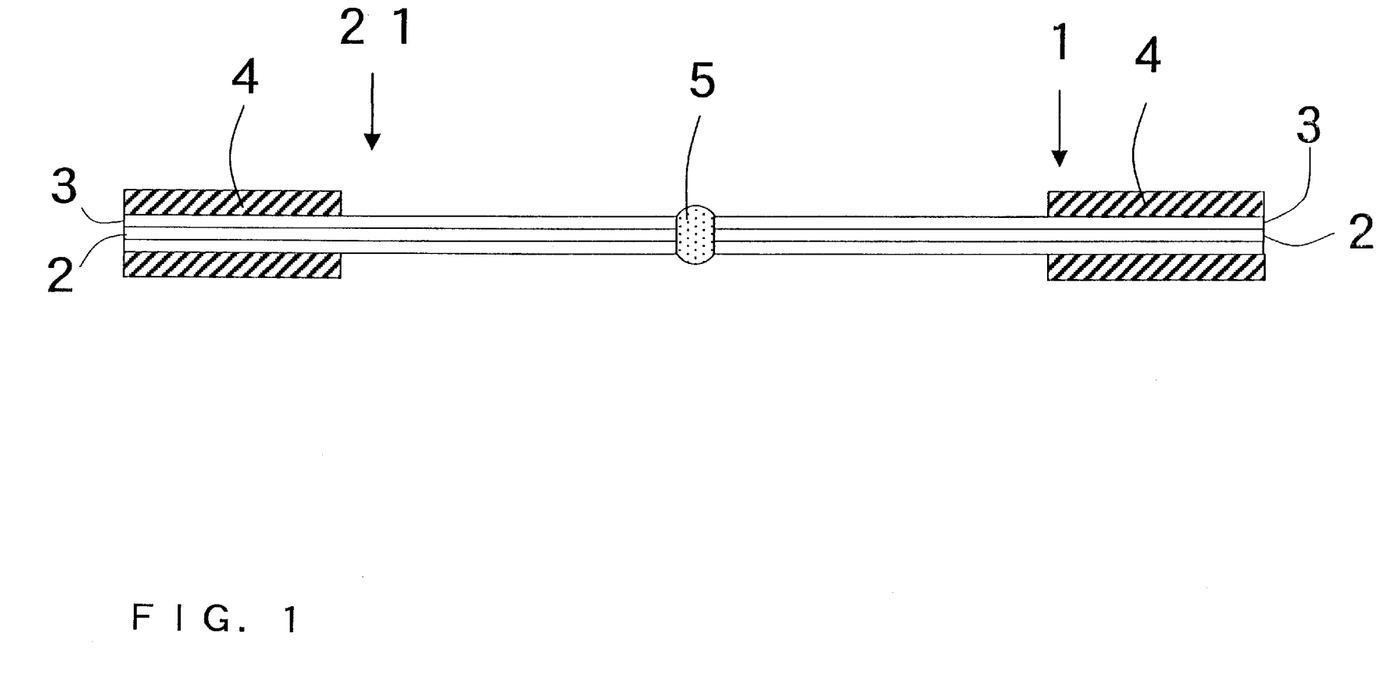
FIG. 1 is a sectional view of a first embodiment of the present invention.

As shown in FIG. 1, a polymer coated layer 4 was removed from 2 cm end portions of first and second single-mode glass optical fibers 1 and 21 (each length of about 1 m), each having a polymer coated layer 4, core portion 2 and clad portion 3, and these end portions were butted against each other on an optical bench (not shown) through an about 25 μm long air gap to align the centers of the optical fibers 1 and 21 with each other. The locations of the fibers were adjusted such that the optical loss value when laser light having a wavelength of 1,550 nm was input from the other end portion of the first optical fiber, transmitted through the first fiber and output from the other end portion of the second fiber became minimum. In this state, the adhesive 5 in the figure (adhesive composition numbers 1, 4 and 9) was coated at the position of the air gap between the two fibers and cured by leaving it at room temperature for 2 hours or by heating coated portions with 110° C. hot air from a drier for about 5 minutes. The initial optical loss value before the coating of the adhesive and the optical loss value after the fiber 21 became minimum. In this state, the adhesive 5 in the figure (adhesive composition numbers 6, 5 and 8) was coated between the two lenses 6 and 26 and cured at room temperature for 2 hours or by heating with 110° C. hot air from a drier for about 5 minutes. The initial optical loss value (before the coating of the adhesive) and the optical loss value after the coating and curing of the adhesive were measured and compared with each other (4 to 6 of Table 4).

Examples 7 to 9
(Bonding Lens to Optical Fiber, Fabrication of Collimator Module)

Figure 3:
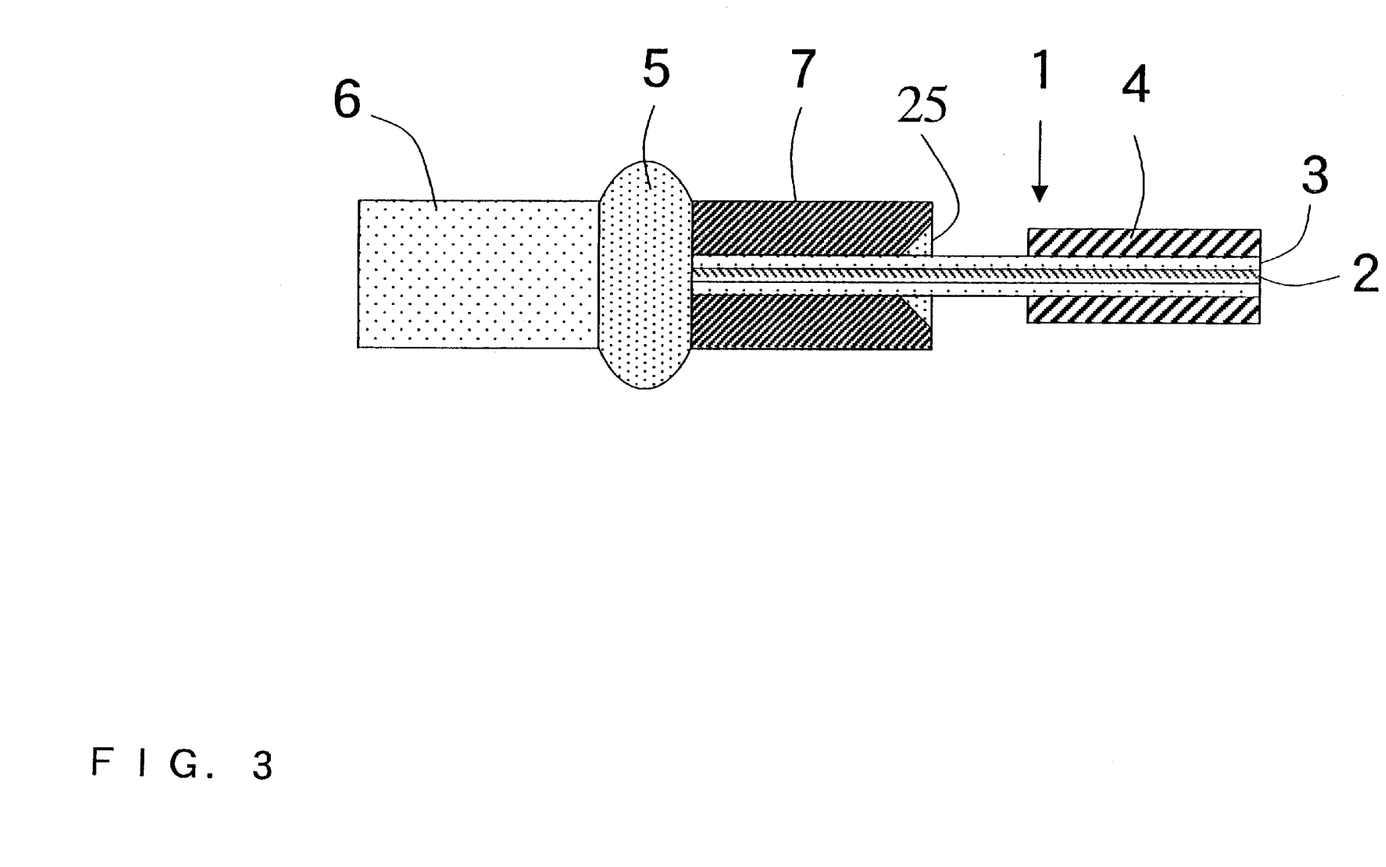
FIG. 3 is a sectional view of still another embodiment of the present invention.

As shown in FIG. 3, one end portion of the optical fiber 1 was inserted into a glass ferrule 7 so that the optical fiber 1 was fixed in a recessed portion of the end portion of the ferrule 7 using an adhesive 25. The center of the ferrule with this fiber and the center of the glass microlens 6 were aligned with each other on an optical bench so that the optical loss value when laser light having a wavelength of 1,550 nm was input from the other end portion of the optical fiber 1 fixed to the ferrule, transmitted through the microlens 6 through an about 250 μm air gap and output to the outside through the microlens 6 became minimum, the adhesive 5 in the figure (adhesive composition numbers 10, 13 and 14) was coated between the lens 6 and the ferrule 7 and cured at room temperature for 2 hours or by heating with 110° C. hot air from a drier to manufacture a collimator module. The initial optical loss value (before the coating of the adhesive) and the optical loss value after the coating and curing of the adhesive were measured and compared with each other (7 to 9 of Table 4).

Examples 10 to 12
(Bonding Lens to Filter)

Figure 4:
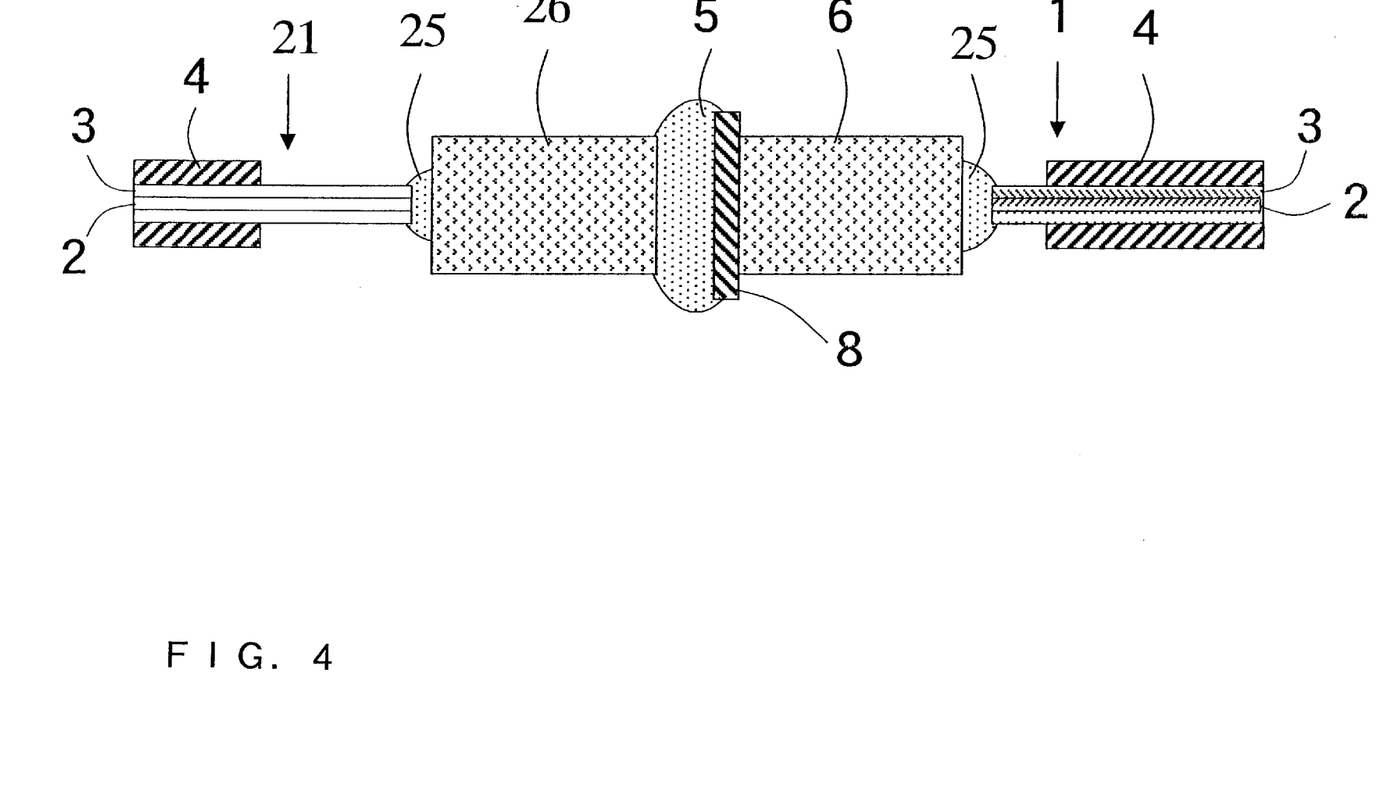
FIG. 4 is a sectional view of a further embodiment of the present invention.

A lens and a filter were bonded together in the same manner as in Examples (4 to 6) for bonding lens to lens as shown in FIG. 4 except that a lens with a filter prepared by bonding the above filter 8 and the above lens 6 together was used in place of the first lens and that the adhesive 5 (adhesive composition numbers 7, 2 and 12) was used in place of the adhesive 5 (adhesive numbers 6, 5 and 8) (10 to 12 of Table 4).

Examples 13 and 14
(Bonding Fiber to Optical Waveguide)

Figure 5:
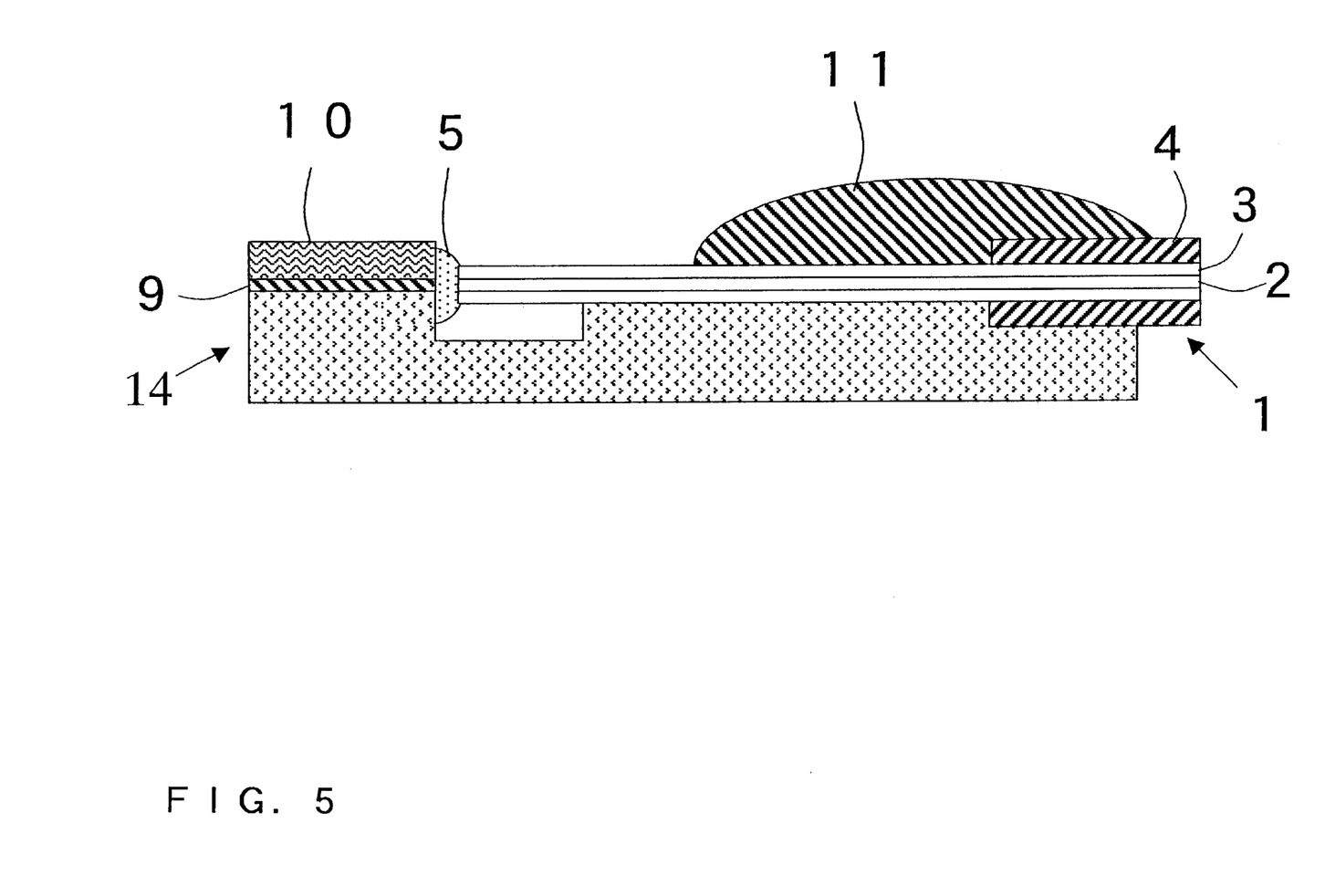
FIG. 5 is a sectional view of a still further embodiment of the present invention.

As shown in FIG. 5, a polymer coated layer 4 was removed from a 2 cm end portion of the above single-mode glass optical fiber 1 (length of about 1 m) having a polymer coated layer 4, core portion 2 and clad portion 3, and fixed on a V-shaped groove of a waveguide by an adhesive 11, and the end portion was butted against the end portion of the optical waveguide core 9 of the above optical waveguide element 14 having a core 9 and a clad 10 through an about 25 μm long air gap to align centers thereof with each other. The location of the optical fiber 1 was adjusted such that the optical loss value when laser light having a wavelength of 1,550 nm was input from the other end portion of the optical fiber, transmitted through the fiber and output from the other end portion of the core of the optical waveguide became minimum, and the adhesive 5 in the figure (adhesive composition numbers 11 and 15) was coated at the position of the air gap between the end surface of the optical fiber 1 and the end surface of the core 9 of the optical waveguide and cured by leaving at room temperature for 2 hours or by heating coated portions with 110° C. hot air from a drier for abut 5 minutes. The initial optical loss value before the coating of the adhesive and the optical loss value after the coating and curing of the adhesive composition were measured and compared with each other (13 and 14 of Table 4).

Example 15
(Bonding Fiber to Optical Waveguide Diffraction Grating)

An optical fiber and an optical waveguide diffraction grating were bonded together in the same manner as in Examples 13 and 14 except that the above waveguide diffraction grating was used in place of the optical waveguide element used in Examples 13 and 14 and the adhesive 5 (adhesive composition number 16) was used in place of the adhesive 5 (adhesive composition numbers 11 and 15) used in Examples 13 and 14 and the optical loss values were measured in the same manner as in Examples 4 to 6. The results are shown in 15 of Table 4.

Example 16

Figure 6:
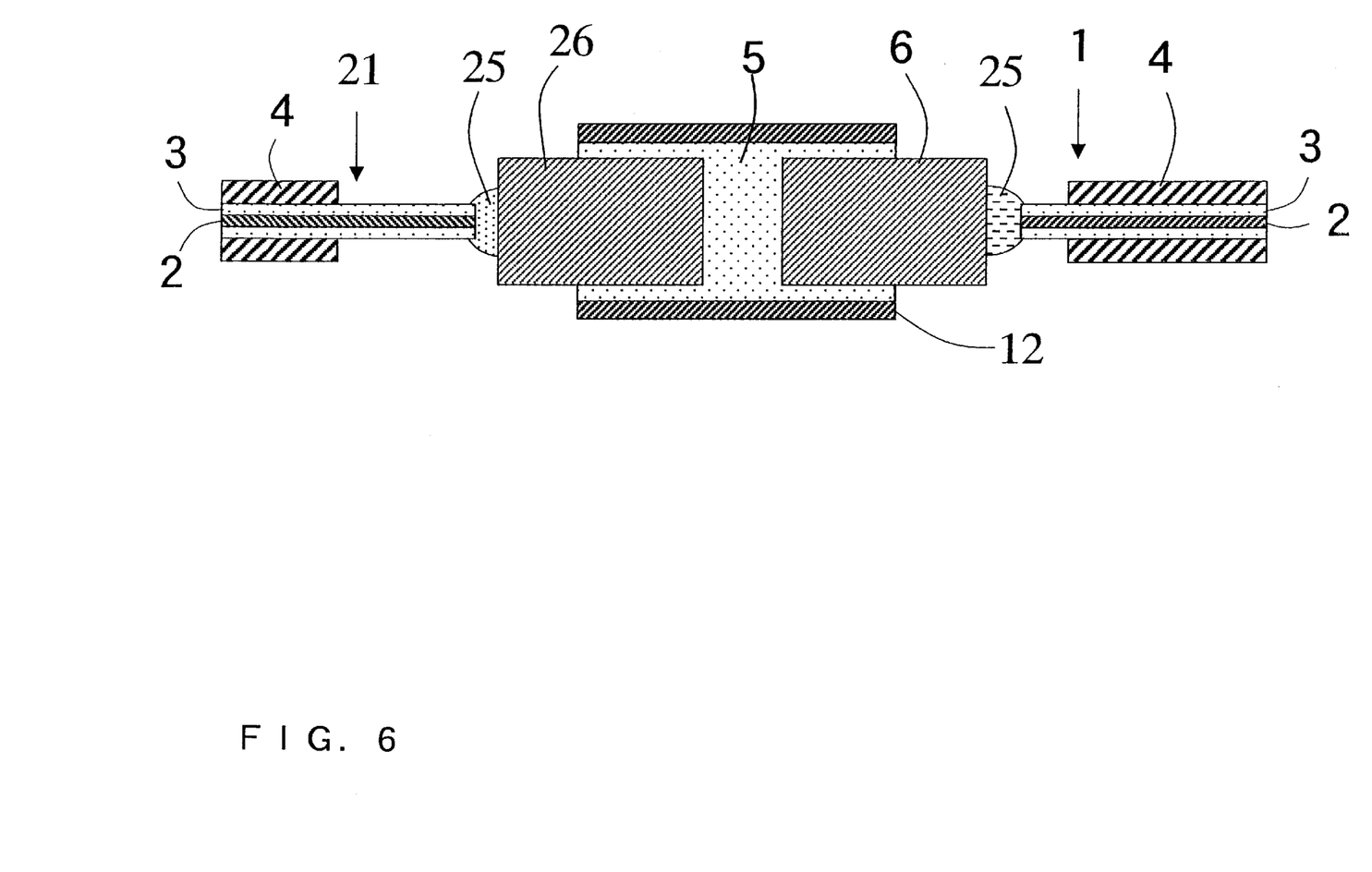
FIG. 6 is a sectional view of a still further embodiment of the present invention.

Lenses were bonded together in the same manner as in Examples 4 to 6 except that the adhesive 5 (adhesive composition number 4) was charged into a space between the lenses 6 and 26 and the ferrule 12 as shown in FIG. 6 instead that the adhesive composition 5 was coated between the lenses 6 and 26. The optical loss values were completely the same as those of Example 4.

TABLE 4

| Ex. | first optical part | second optical part | adhesive composition No. | output during existence of air gap (dB · m) | output after curing of adhesive (dB · m) |
| --- | --- | --- | --- | --- | --- |
| 1 | optical fiber | optical fiber | 1 | 11.50 | 11.16 |
| 2 | optical fiber | optical fiber | 4 | 11.50 | 11.20 |
| 3 | optical fiber | optical fiber | 9 | 11.50 | 11.12 |
| 4 | lens | lens | 6 | 11.00 | 10.10 |
| 5 | lens | lens | 5 | 11.00 | 10.00 |
| 6 | lens | lens | 8 | 11.00 | 10.20 |
| 7 | lens | optical fiber | 10 | 11.70 | 11.30 |
| 8 | lens | optical fiber | 13 | 11.70 | 11.20 |
| 9 | lens | optical fiber | 14 | 11.70 | 11.40 |
| 10 | lens | optical filter | 7 | 20.40 | 19.20 |
| 11 | lens | optical filter | 2 | 20.40 | 19.60 |
| 12 | lens | optical filter | 12 | 20.40 | 19.40 |
| 13 | optical fiber | optical waveguide | 11 | 15.1 | 14.80 |
| 14 | optical fiber | optical waveguide | 15 | 15.10 | 14.70 |
| 15 | optical fiber | optical waveguide diffraction grating | 16 | 15.10 | 14.80 |

Ex.: Example

As described above, according to the present invention, an optical device comprising optical parts bonded together with an adhesive layer having excellent adhesion strength, a small light transmission loss and excellent environmental resistance (heat resistance, weatherability, humidity resistance and chemical resistance) is obtained by preventing the generation of gas and shrinkage in the adhesive curing step.

What is claimed is:

1. An optical device comprising at least two optically transparent optical parts which are bonded together with an optically transparent adhesive layer, wherein the adhesive layer is formed from a matrix containing oxygen atoms and at least one type of specific atoms selected from the group consisting of silicon, titanium, zirconium, aluminum and germanium, at least part of the specific atoms is bonded to other specific atom(s) through a polyvalent hydrocarbon group having 2 to 8 carbon atoms and directly bonded to at least one monovalent hydrocarbon group selected from the group consisting of an alkyl group, phenyl group, monovalent fluorine-containing hydrocarbon group, and monovalent sulfur-containing hydrocarbon group, and the contents of the above specific atom, the polyvalent hydrocarbon group and the monovalent hydrocarbon group are adjusted such that the refractive index value of the adhesive layer approximates the refractive index values of the at least two optically transparent optical parts, wherein when the refractive index values of the two optical parts are represented by $n_1$ and $n_2$ ($n_1 \geq n_2$), the adhesive layer between the optical parts has a refractive index $n_3$ represented by the following expression (1):

$$\sqrt{(n_1 \cdot n_2)} - ((\sqrt{(n_1 \cdot n_2)} - n_2)/3) - 0.05 \leq n_3 \leq \sqrt{(n_1 \cdot n_2)} + ((n_1 - \sqrt{(n_1 \cdot n_2)})/3) + 0.05 \quad (1)$$

and wherein the adhesive layer contains the polyvalent hydrocarbon group and the monovalent hydrocarbon group in amounts of 0.01 to 30 wt % and 30 to 80 wt %, respectively.

2. The optical device of claim 1, wherein when the refractive index values of the two optical parts are represented by $n_1$ and $n_2$ ($n_1 \geq n_2$), the adhesive layer between the optical parts has a refractive index $n_3$ represented by the following expression (2):

$$\sqrt{(n_1 \cdot n_2)} - ((\sqrt{(n_1 \cdot n_2)} - n_2)/4) - 0.03 \leq n_3 \leq \sqrt{(n_1 \cdot n_2)} + ((n_1 - \sqrt{(n_1 \cdot n_2)})/4) + 0.03 \quad (2).$$

3. The optical device of claim 1, wherein the optical parts are optical fibers, lenses, filters, optical waveguides, diffraction gratings or optical active elements.

4. The optical device of claim 1, wherein one of the at least two optical parts is an optical fiber and the other optical part is a lens, filter or optical waveguide.

5. The optical device of claim 1, wherein the at least two optical parts are both optical fibers.

6. The optical device of claim 1, wherein the at least two optical parts are made from glass, plastic or organic-inorganic composite material.

7. The optical device of claim 1, wherein the at least two optical parts are made from glass.

* * * * *